Aug. 29, 1939.   C. STEINER   2,171,229
PROCESS FOR MANUFACTURING CAST BEARINGS FROM LIGHT METAL ALLOYS
Filed May 4, 1937   2 Sheets-Sheet 1
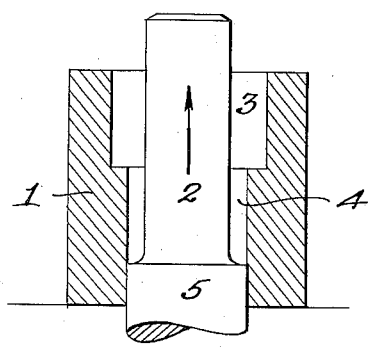
Fig.1.
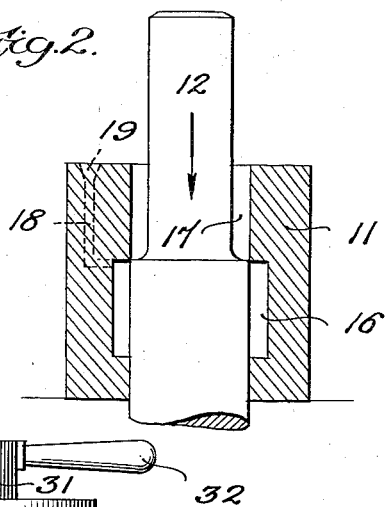
Fig.2.
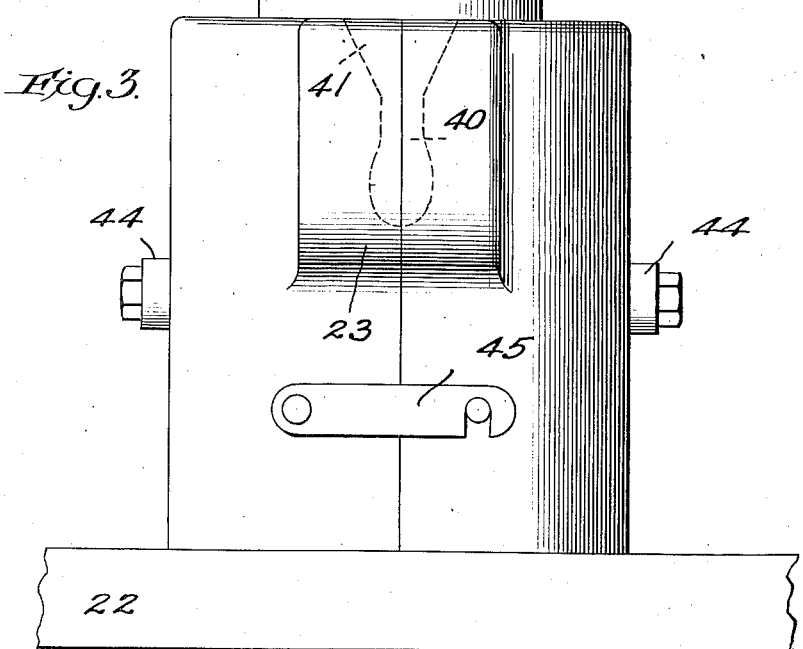
Fig.3.
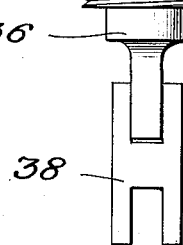
INVENTOR.
CARL STEINER
BY
ATTORNEY.

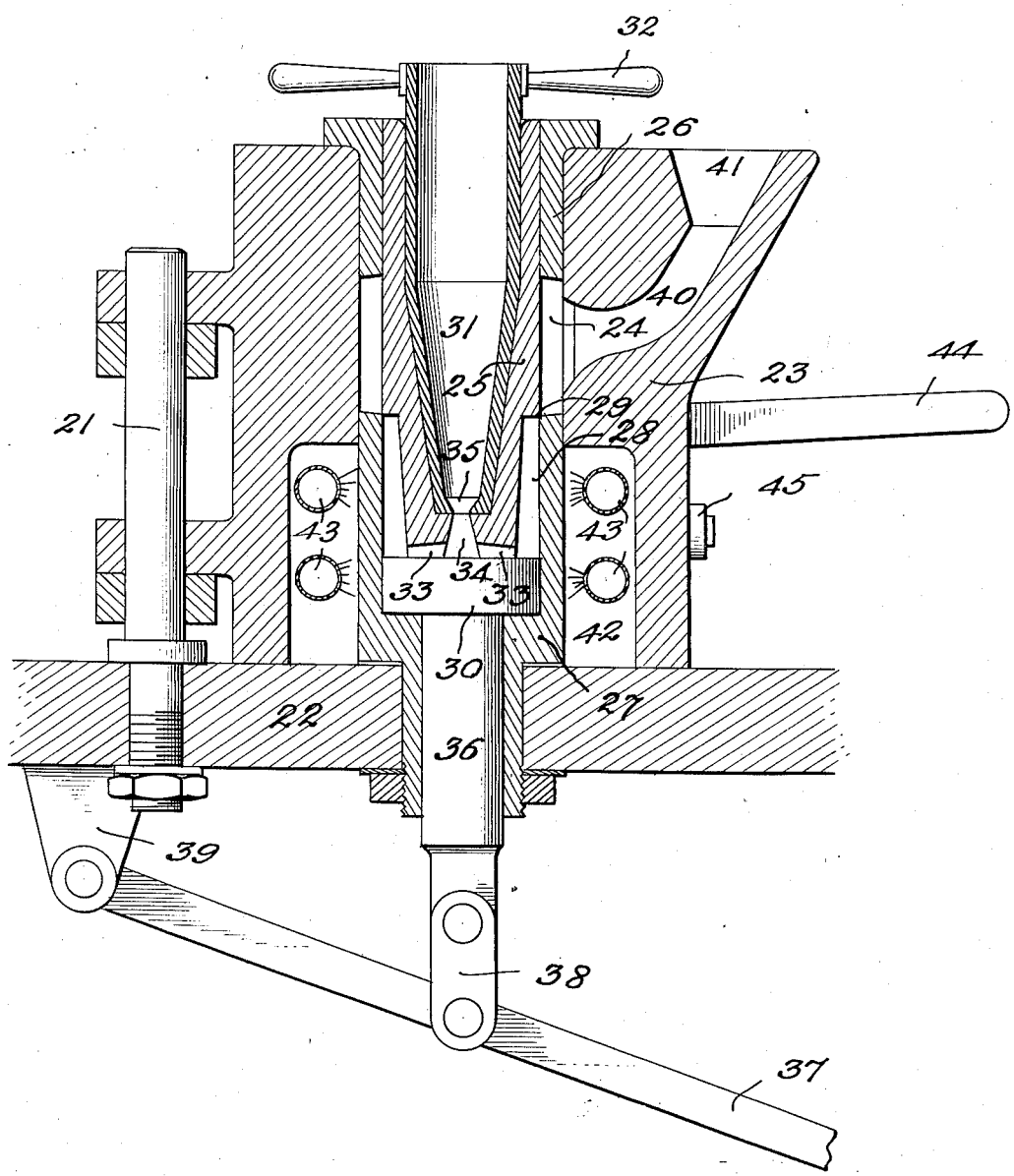

Patented Aug. 29, 1939

2,171,229

UNITED STATES PATENT OFFICE 2,171,229

PROCESS FOR MANUFACTURING CAST BEARINGS FROM LIGHT METAL ALLOYS

Carl Steiner, Heilbronn, Germany, assignor to American Lurgi Corporation, New York, N. Y., a corporation of New York Application May 4, 1937, Serial No. 140,600
In Germany December 18, 1935

9 Claims. (Cl. 22—201)

The present invention relates to a process for manufacturing cast bearings from light metal alloys, and to the product thereof.

Heretofore, the outer or supporting shells of bearings, for example, for steam engines, locomotives, internal combustion engines, and the like have been produced from a heavy metal such as bronze, brass, cast iron or even steel, and the inner shell or bearing surface was formed from a bearing metal such as a tin or lead alloy or a copper-lead alloy. With the increased demands for increased structural strength of bearings and with the increased operating velocity, these materials no longer sufficed. The tin and lead alloy bearing surfaces were stripped off in the high speed automotive engines and sometimes destroyed. Owing to the high coefficient of friction of copper-lead alloys when used as inner shells or bearing surfaces, the frictional heat was high and the bearing journal had to be hardened in order to hold the wear within permissible limits. The tendency in motor manufacture is moreover toward ever higher operating temperatures. For example, a temperature of 140° C. is considered normal in the cooling systems of airplane motors to-day. Under such conditions, the bearing temperature also rises so that from this basis also the tin and lead alloys cannot be used as inner shells or linings. Thus, the art was confronted with the problem of producing bearings with a relatively low coefficient of friction and capable of withstanding the high operating temperatures which are common to-day. In addition the bearings must be tough enough to withstand the disintegrating effects of modern high operating speeds but soft enough to keep journal wear within permissible limits. There is also the requirement that the structural strength of the bearings be sufficient to enable the bearing to have a reasonable operating life. It has been proposed to make such bearings from specific aluminum alloys of suitable structural strength. However, such alloys in general were too hard for use as satisfactory bearing surfaces, although satisfactory as outer shells. Many other proposals have been made to overcome the shortcomings of prior art aluminum bearings, but none, as far as I am aware, has been wholly successful when carried into practice on an industrial scale to produce commercially acceptable products which are practically perfect technically.

It is an object of the present invention to provide a method of manufacturing cast composite light metal bearings.

It is another object of the present invention to provide a method of manufacturing cast composite light metal bearings with bearing surfaces or linings superior to those of prior art light metal bearings or conventional bearings.

A further object of the present invention is to provide cast composite light metal bearings with superior bearing surfaces or linings combined with outer or supporting shells of structural light metals.

The present invention also contemplates the provision of novel cast composite light metal bearings in which the bond between the outer and inner shells is formed while the metals are in the molten or semi-plastic state.

It is likewise within the contemplation of the present invention to provide a cast composite light metal bearing comprising an outer or supporting shell of an aluminum alloy of structural strength and capable of retaining its strength at high temperatures and a bearing surface or lining comprising aluminum or magnesium alloys having good anti-friction properties and lower coefficients of friction.

Other objects and advantages will become apparent from the following description of the novel casting process taken in conjunction with the accompanying drawings, in which:

Fig. 1 illustrates a vertical sectional view, somewhat diagrammatic, of an embodiment of the present invention capable of carrying the present process into practice;

Fig. 2 is a similar view to Fig. 1 of another embodiment of the present invention;

Fig. 3 is a view in elevation.

Fig. 4 is a detailed view partly in section and partly in elevation of a preferred embodiment of the present invention.

Generally speaking, the present invention contemplates the provision of a permanent mold. This mold is equipped with a cylindrical core capable of being moved or slid back and forth, especially up and down. Within the mold and surrounding the core, two annular chambers are provided for the reception of plastic metal. The metal for one of the shells of the composite bearing is poured into one of the chambers and then the metal for the other shell is poured into the other cavity or chamber. While the metals are at least superficially fluid or semi-plastic, they are brought into contact with each other by a suitable movement of the core. Thus, the surfaces of the metals which subsequently form the bond between the shells are protected against oxidation and the resulting diffusion of the metals forms a strong autogenous bond.

It is well known in the art that for composite bearings of this type comprising two different types of light metal alloys the union or bond between the two metals must be tenacious. Such bonds are often defective due to the oxidation which takes place at the contacting surfaces of the metals. Such oxidation is practically eliminated by the present process. In addition exceptionally strong bonds are formed when the casting is conducted in accordance with the principle of the present invention.

Referring more particularly to Fig. 1 which is a diagrammatic sketch of an embodiment of the present invention, the reference character 1 designates a mold of the improved casting device. Within the mold, a piston 2 is slidably arranged to function as the core for the casting. Surrounding the upper part of the piston, an annular recess 3 is provided in the mold which constitutes a part of the casting chamber. Associated with the recess is an annulus 4 which extends to the shoulder of a body 5 provided on the lower part of the piston. The dimensions of chambers 3 and 4 are cooperatively proportioned respectively to the dimensions of the entire bearing and to the dimensions of the inner shell. In casting the composite bearings, a light metal suitable for bearing surfaces is cast in chamber or annulus 4. Sufficient metal is poured into the chamber to fill it completely. After pouring the metal for the bearing surface or inner shell, a metal suitable for the outer shell is poured into annulus or chamber 3. The amount of metal poured into cavity 3 should be less than that necessary to fill the chamber. When more is placed therein it will be displaced in the next operation. After the metal for the outer shell has been poured into chamber 3 the piston or core 2 is drawn up while the metals are still fluid or semi-plastic and preferably while the temperatures of the metals lie between those of the liquidus and solidus curves. The metal in chamber 4 displaces a part of the metal in chamber 3 toward the periphery of the chamber. Any excess of metal is forced out of the mold. This results in a firm bond not subject in any practical degree, to the drawbacks of prior art composite bearings of light metals which are due to surface oxidation of the contacting surfaces.

Another embodiment of the present invention is illustrated in Fig. 2. A mold and its walls is designated by the reference character 11. A piston 12 is slidably arranged within the mold to function as the core for the casting. Surrounding the lower part of the piston and cooperating with piston 12 is an annular recess 16 which extends to a shoulder on piston 12. Associated with recess 16 is an annulus 17 surrounding the upper part of piston 12 and extending to the shoulder on piston 12. The dimensions of recess 16 and recess 17 are respectively cooperatively proportioned to the dimensions of the entire bearing and the dimensions of the inner shell or bearing surface. At an appropriate point in the walls of the mold a casting canal mouth 19 is provided which in conjunction with casting canal 18 provides a conduit means for pouring a predetermined quantity of metal into the annulus 16. In proceeding in accordance with the process of the present invention, a predetermined quantity of structural light-metal is poured into chamber 16 through casting canal 18. Gases trapped in chamber 16 escape by the usual means. After the predetermined quantity of metal has been poured into chamber 16 sufficient light metal suitable for bearing surfaces is poured into annulus 17. While the metal is at least superficially fluid or semi-plastic, that is, while the temperatures of the metals are between those of the liquidus and solidus curves, the piston sinks or is depressed. Thus, the metals of the shells are brought into intimate contact with practically no oxidation of the contacting surfaces.

For the purpose of giving those skilled in the art a better understanding of the novel casting process, a description of a preferred embodiment is given in conjunction with Figs. 3 and 4. Fig. 4 is a view of a permanent mold partly in section and partly in elevation which has given satisfactory results. The mold is formed of two parts pivotally mounted on an axle or bolt 21 which is firmly attached to the solid foundation 22. When closed and in use the halves of the mold are held together by a catch or latch or similar device 45. The mold walls are designated by the reference character 23. The annular space 24 provides a casting chamber for the metal of which the supporting or outer shell of the bearing box is formed. This chamber or cavity is limited by the walls 23 and the inner circumference by the outer periphery of the hollow core 25. The upper wall of the space 24 is formed by a sleeve 26 and the lower wall by the sleeve 27. Directly beneath the hollow space 24 is another chamber or cavity 28 for receiving the molten metal which is to form the bearing surface of the bearing box. The outer circumference of the casting chamber 28 is limited by the inner periphery of the sleeve 27. The inner circumference of the casting space 28 is limited by the outer periphery of the slightly tapered core 25. The upper end of the chamber 28 is formed by a shoulder 29 on core 25. The lower wall of the cavity 28 is formed by the surface of piston 30. The hollow core 25 is provided with a casting funnel 31, and a hand grip 32. Connecting the casting funnel 31 with the radial casting canals 33 is another casting canal 34 provided with a gate 35. The radial casting canals 33 connect the funnel 31 with the casting chamber 28. Piston 30 is provided with a shank 36 capable of vertical slidable motion within the sleeve 27 and actuated by lever 37 pivoted at 38 and 39.

Suitably disposed within the walls 23 is a casting canal 40 with a gate 41. By means of this casting canal 40 the metal for the outer or supporting shell of the bearing box is cast in space 24. Suitably disposed about the mold in space 42 surrounding the lower portion of the casting chamber are burners 43 for heating the mold as is necessary. The mold is provided with a handle 44 for opening the mold after pouring.

In casting light metal bearings by the improved process the metal which is to form the inner shell or bearing surface is cast in the space 28 by pouring the molten metal through the funnel 31. The molten metal in quantity sufficient to completely fill chamber 28 passes from the funnel 31 to the canal 34 by means of gate 35 and thence to radial canals 33 which open into chamber 28. After the inner shell has been cast and while the metal is still hot the outer shell is cast by pouring a molten metal of suitable composition into space 24 by means of canal 40 and gate 41. The metals are permitted to cool sufficiently to reach a semi-plastic state. For aluminum alloys such as described hereinabove the temperatures suitable for this purpose lie between about 680° C. and about 520° C. In general the temperatures lie between those of the liquidus and solidus curves for the metals in question. When the metals of the shells have reached the semi-plastic state such as that of dough or plastic clay the piston 30 is raised by means of lever 37 and the metal of the shells brought into juxtaposition one within the other. After the casting has cooled sufficiently, the funnel 31 is twisted by means of hand grip 32 and the metal fin at the junction of gate 35 and canal 34 broken and the funnel removed. The mold is then opened and the finished casting removed. It is to be observed that the diameters and lengths of the casting chambers are cooperatively proportioned to insure that after casting the metal and before insertion into the casting space of the outer shell the outer diameter of the annulus of metal in chamber 28 will be exactly that which will permit insertion in the annulus of metal in the chamber 24 and form a firm bond free of the defects which have heretofore militated against the use of similar composite light metal bearings. The length of the finished casting is that of the bearing box, while the inner diameter of the annulus of metal cast in chamber 28 is proportioned to that of the diameter of the shaft with which the bearing is to be used.

It is to be observed that the diffusion of the metals is brought about during the time when the temperatures of the metals lie between those of the liquidus and the solidus curves of the metals. Of course, it is to be understood that, as is well known in the art, the mold and the core may be preheated to insure that there will be no chilling of the metal when first cast.

Another embodiment of the present invention involves the use of a rotatable centrifugal mold. When such mold is used as much of a suitable light metal is poured into the mold as is necessary to form the supporting shell. While the metal of the outer shell is still fluid or semi-liquid, the metal for the bearing surface or inner shell is cast as a lining of the outer shell by centrifuging.

As in conventional practice, it is possible to cast the outer shell separately. The pre-cast outer shell may then be placed in a centrifugal casting machine and the inner or bonding surface heated to incipient fusion or at least until the inner surface of the ring has become semi-plastic. Then the metal for the bearing surface of the bearing is cast by centrifuging upon the preheated plastic surface of the outer shell.

As alloys for the outer or supporting shell, an aluminum alloy containing about 18 to 23% of silicon and preferably about 20 to about 22% of silicon may be used. If necessary, additions of magnesium, nickel, copper, cobalt, chromium and/or manganese may be made up to about 3%. It is also within the scope of the present invention to use other light metals with similar high structural strength for the outer shell. An alloy which has given satisfactory results comprises about 21% silicon, about 0.5 to about 3% copper or nickel, about 0.2 to about 1.5% magnesium, about 1 to about 3% cobalt and the balance substantially aluminum. Alloys for use in forming the outer shell which have been found useful have a Brinell hardness of about 100 kilograms per square millimeter. Alloys with a Brinell hardness of about 30 to 60 kilograms per square millimeter have been found satisfactory for use as linings or inner shells of composite bearings in accordance with the present invention. As illustrative of the types of light metal alloys which may be used to form the lining or bearing surface, the following have given satisfactory results:

Aluminum-alloy containing about 3 to about 10% antimony and eventually up to 3% manganese.

Aluminum-alloy containing about 5 to about 10% magnesium.

Magnesium-alloy containing about 5 to about 10% aluminum or limited additions of lead or silicon which form other crystal types in the matrix.

After pouring the metals in the annular spaces 24 and 28, in Fig. 3, there will, of course, in most instances be a little solidifying of the metal at the outer wall of the space 24 and perhaps at the inner wall of space 28. But care should be taken that the surfaces of the both metals that are brought in contact with each other after movement of the piston are in a fluid or at least a semi-plastic condition. A semi-plastic condition means to metallurgists a well-known mixture of solid and fluid material which exists between the solidus and the liquidus curves of the thermal diagrams. For this purpose the outer wall of space 28 is heated by burners 43 and the metal in the non-specially heated space 24 cast after the casting has been poured in space 28. In this way, it is possible that during the movement of the piston positioning the two rings, one within the other, the fluid or semi-plastic surfaces are sliding, one against the other. Thus, a rather good diffusion or even an intermingling to a certain depth of the two alloys, is procured, so that a rather broad bonding zone is obtained. After completing the movement the solidification of the fluid or semi-plastic zones is completed and the result is a bearing with an outer shell of structural strength and an inner lining with good bearing qualities, the whole or both shells being light metals.

The advantages of a bearing produced in accordance with any of the materials of the present invention are many. The bearing is of light weight, higher heat conductivity, higher resistance to overheating than bearings made of babbitt, for example and exhibits a smaller amount of wear on the bearing and journal if the latter is not too hard.

Although the present invention has been described in conjunction with a preferred embodiment, it is to be understood that variations and modifications may be resorted to as those skilled in the art will readily understand. Such variations and modifications are considered to be within the purview of the specification and the scope of the appended claims.

A practical example of the invention is as follows:

An alloy of the aluminium with 4 to 6% antimony and about 1% manganese is melted, and the pouring temperature thereby raised to 850 to 900°. This alloy is introduced through opening 35 into annular space 28 until the latter is full. Immediately thereafter an aluminium alloy with, for example, the following composition:

| | Per cent |
|---|---|
| Silicon | 20 to 22 |
| Copper | 1 to 2 |
| Nickel | 1 to 2 |
| Manganese | 0.5 to 1 |
| Cobalt | 1 to 2 |
| Aluminium with the usual trade impurities | Remainder | is brought to a melting temperature of 800 to

820° and poured through gate 41 into annular space 24. As soon as this is full, piston 30 is shifted upwards. There is no pause between these operations, but they follow each other immediately as only in this way can it be ensured that the connecting surfaces are still in, at least, a semi-plastic condition.

For smaller dimensions, for instance, wall thicknesses of 3 to 6 mm., mould 27 must be heated by burner 43, so that the metal therein is not completely solidified before pouring out.

I claim:

1. The method of casting composite light metal bearings which comprises casting a bearing shell of a suitable light metal in a cavity formed between the walls of a mold and the periphery of a core, casting the other shell of the bearing in a second cavity formed between the walls of said mold and the periphery of that portion of said core which extends beyond the limits of said first cavity but within the boundaries of said mold, and causing diffusion of said metals while in a substantially semi-plastic state by a suitable movement of said core whereby a cast composite light metal bearing is formed substantially without oxidation of the contacting surfaces of said metals.

2. The method of casting composite light metal bearings which comprises casting an inner shell of a suitable light metal to serve as the bearing surface of the bearing, casting the outer shell of said bearing of a second light metal while the metal of said inner shell is substantially liquid and uniting said shells by a suitable upward movement of a core while the temperatures of the metal surfaces lie between those of the liquidus and solidus curves whereby a cast composite light metal bearing is formed substantially without oxidation of the contacting surfaces of said metals.

3. The method of casting composite light metal bearings which comprises casting the outer shell of a suitable light metal, casting the inner shell of a suitable light metal while the metal of said outer shell is at least superficially liquid and causing said metals to intermingle by a suitable downward movement of a core the periphery of which formed inner walls of cavities into which said metals were cast while the metals of said shells are in a substantially liquid state whereby cast composite light metal bearings are obtained substantially without oxidation of the contacting surfaces of said metals.

4. The method of casting composite light metal bearings which comprises forming a cavity between the walls of a mold, a shoulder on a core within said mold and the periphery of said core adjacent to said shoulder, forming a second cavity between that portion of the inner walls of said mold contiguous to the upper limit of said first cavity and that portion of the periphery of said core extending beyond the upper limits of said first cavity but within the boundaries of said mold, pouring a liquid light metal suitable for a bearing lining in said first cavity, pouring a liquid light metal suitable for a structural supporting shell in said second cavity, causing said metals in both cavities to diffuse by a suitable upward movement of said core while said metals are substantially semi-plastic whereby a cast composite light metal bearing is obtained substantially without oxidation of contacting surfaces of the metals.

5. The method of casting composite light metal bearings which comprises forming a cavity between the walls of a mold, the periphery of a portion of a core within said walls and shoulders formed in said walls, forming a second cavity between that portion of said inner walls contiguous to the upper limits of said first cavity, a shoulder on said core and that portion of said core extending beyond said shoulder of said core but within the walls of said mold, pouring liquid light metal suitable for a structural shell into said first cavity to fill said cavity, pouring a liquid light metal suitable for a bearing surface into said second cavity, and causing said metals to diffuse while substantially semi-plastic by a suitable downward movement of said core whereby a cast composite light metal bearing is obtained substantially without oxidation of the contacting surfaces of said metals.

6. The method of casting composite light metal bearings which comprises casting a supporting shell of an aluminum alloy containing about 20 to about 22% silicon, casting an inner shell of a light metal alloy selected from the group consisting of an aluminum alloy containing about 3 to about 10% antimony, an aluminum alloy containing about 5 to about 10% magnesium and an magnesium alloy containing about 5 to about 10% aluminum and causing the metals of said shells to commingle by a suitable movement of a core while the temperatures of said metals lie between those of the liquidus and solidus curves whereby a cast composite light metal bearing is obtained substantially without oxidation of the contacting surfaces of said metals.

7. The method of casting composite light metal bearings which comprises casting a supporting shell of a light metal structural alloy having a hardness of about 100 kilograms per square millimeter, casting an inner shell of a light metal having a hardness of about 30 to about 60 kilograms per square millimeter, and causing the metals of said shells to commingle by a suitable movement of a core while the metals of said shells are still substantially semi-plastic whereby cast composite light metal bearings are obtained substantially without oxidation of the bonding surfaces of said metals.

8. The method of producing composite light metal bearings which comprises casting a supporting shell constituted of an aluminum alloy having great structural strength, casting an inner shell constituted of a light metal alloy having good anti-friction properties, and bringing the outer surface of said inner shell into intimate contact with the inner surface of said outer shell while both shells are at least in a semi-plastic condition.

9. The method of producing composite light metal bearings which comprises casting a supporting shell of an aluminum alloy having great structural strength, casting an inner shell of a light metal alloy having good anti-friction properties and having such dimensions that its outer circumferential surface conforms to the inner face of said structural shell, and subsequently causing relative displacement of said shells to bring said conforming surfaces of the shells into intimate contact with each other while they are at least in a semi-plastic condition whereby said shells will be firmly bonded to each other by restricted diffusion of their contacting portions.

CARL STEINER.